March 19, 1946.  H. R. ELLINWOOD  2,396,837
AIRCRAFT CONDUIT SUPPORTING CLIP
Filed Jan. 23, 1942
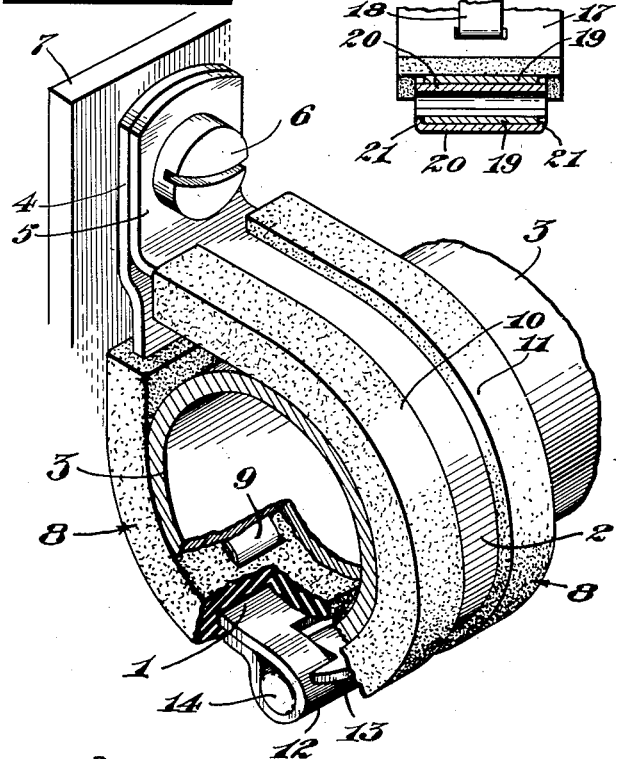
Inventor
Herman Ray Ellinwood
By R. S. Berry
Attorney

UNITED STATES PATENT OFFICE 2,396,837

AIRCRAFT CONDUIT SUPPORTING CLIP

Herman Ray Ellinwood, Burbank, Calif., assignor to Adel Precision Products Corp., Burbank, Calif., a corporation of California Application January 23, 1942, Serial No. 427,883

2 Claims. (Cl. 174—40)

This invention relates to improvements in aircraft conduit supporting clips of the type forming the subject matter of United States Letters Patent No. 2,215,283, issued to Paul W. Adler on September 17, 1940.

Heretofore clips for supporting conduit and other lines in aircraft have been constructed of a one-piece resilient metal strap adapted to embrace the conduit line to be supported and carrying a conduit embracing cushion of resilient insulation material and an electrically conductive bonding strip. The ends of the strap are apertured for fastening elements whereby the strap and cushion may be clamped tightly on the conduit line and said ends secured to a metallic structural part of an aircraft. The bonding strip overlies the cushion for contact with the conduit and also contacts the strap so as to bond the conduit to the metallic structure of the aircraft through the contact of the strap and fastenings therewith. In installing these clips the ends of the straps are sprung apart sufficiently to permit of placing or "snapping" the clip on the conduit, or the clip is placed endwise on the conduit before the latter is mounted in place. In most instances deformation of the clip is required to mount it on the conduit and clamp it thereon, also secure it to the metallic structure of the airplane. In any event these methods of affixing the clips on the conduit lines and securing them to the aircraft structure are time consuming and difficult of performance in confined places. Moreover, the bending or deforming of the clip as necessary to apply it, or the moving of the clip relative to the conduit while the bonding strip is in contact therewith as in "snapping" the clip on or in endwise mounting thereof, may in some cases damage and derange the parts thereof, especially the bonding strip which of necessity is made of soft, thin, highly flexible metal and therefore quite fragile and easily abraided and damaged. Furthermore, the strip is likely to become coated with grease or dirt or similarly impaired as to conductivity when the clip is snapped onto or slid endwise on the conduits as aforesaid.

The primary object of the present invention is to provide a conduit clip of the character described which instead of being formed of a one-piece metal strap and a one-piece cushion is made of complementary sections joined by a hinge or similar means of connection affording a free "opening" and an easier and more direct application of the clip without necessitating the bending, springing or deforming of the parts thereof, or the sliding or moving of the bonding strip against the conduit and possibly objectionably abraiding and contaminating it to the extent of impairing the contacting and conductive qualities thereof.

Another object of my invention is to provide a conduit clip of the character described which may consist of separate complementary sections which upon being positioned to embrace the conduit may be joined together at their ends to clamp the conduit and permit of securing the clip as a whole to a metallic structural part of an airplane or the like.

With the foregoing objects in view, together with such other objects and advantages as may be subsequently appear, the invention is carried into effect as illustrated by way of example in the accompanying drawing in which:

Fig. 1 is a fragmentary perspective view of a conduit clip embodying the present invention as when in use;

Fig. 2 is a sectional view of the clip as when opened for application to a conduit;

Fig. 3 is a sectional view taken on the line 3—3 of Fig. 2;

Fig. 4 is a sectional view taken on the line 4—4 of Fig. 2;

Fig. 5 is a fragmentary sectional view of a modified form of the invention;

Fig. 6 is a sectional view taken on the line 6—6 of Fig. 5;

Fig. 7 is a fragmentary sectional view of another modified form of the invention;

Fig. 8 is a fragmentary sectional view of another modified form of the invention;

Fig. 9 is a fragmentary plan view of the form of the invention shown in Fig. 8.

Referring to the drawing more specifically, 1 and 2 designate complementary arcuate sections of a resilient metallic strap which are adapted to embrace the conduit 3, and have apertured outer terminals 4 and 5 adapted to abut one another and be secured by means of a bolt 6 or similar fastening to a metallic structural part 7 of an airplane.

Each of the sections 1 and 2 has associated therewith a cushion strip 8 of resilient insulation material and a thin flexible metallic bonding strip 9 which latter is associated with the cushion and strap sections so as to contact the latter and also the conduit seated on the cushion sections. As here shown each cushion strip 8 has its associated bonding strip 9 reeved or threaded thereto and extending lengthwise thereof with portions lying against the metallic strap section and portions lying on the cushion strip for contact with the conduit. However, any association of a bonding strip with a cushion and a strap section in which the strip is presented for contact on the cushion with the conduit and also disposed for contact with the strap, is deemed to be within the scope of this invention.

As here shown each cushion has marginal flanges 10 and 11 for holding it on the strap section, yet it is to be understood that any other means of providing a cushion on the strap may be resorted to as long as a cushion is provided on the strap so as to dampen vibrations in the conduit line and cooperate with the bonding strip to hold it against the conduit.

Under the provisions of this invention the complementary clip sections are constructed so that they may be placed while "open" or spread apart on the conduit at the point where the clip is to be clamped, then brought together so that the ends thereof which are subject to connection or which may have been connected will cooperate to provide a complete conduit embracing, cushioned and bonded clip which may be readily mounted on the desired metallic structural part of the airplane.

As shown in Figs. 1 to 4 inclusive, the inner ends of the metal strap sections 1 and 2 are bent back upon themselves to form complementary and interfitting hinge barrels 12 and 13 which have a hinge pin 14 inserted therethrough to form a hinge connection between the clip sections. This arrangement provides for readily opening or spreading apart and applying the clip to a conduit without necessitating the springing or bending of the clip or the sliding thereof along or relative to the conduit and therefore eliminates the possibility of deranging the parts or damaging or contaminating the bonding strip with grease, dirt or other foreign matter which would impair the conductivity thereof.

It is seen that when the clip is secured by means of the fastening 6 it completely and tightly embraces and supports the conduit in close conformity thereto with the contiguous ends of the cushion strips 8 in abutting or substantially abutting relation and thus forming a "continuous" cushioned seat for and substantially surrounding the conduit whereby the bonding strip sections make an effective electrical connection with the conduit and the metal strap sections.

A modified form of the invention as shown in Figs. 5 and 6 employs the same complementary strap sections 15 and 16 as in the other form of the invention, including the cushion strips 17 and the bonding strips 18, but has a different type of hinge connection wherein the inner ends of the strap sections are bent to provide interfitting hooks 19 and 20 of arcuate form nesting one within the other and subject to relative movement as in a hinge. The outermost hook 20 is the longest and has its longitudinal edges upset to provide small marginal flanges 21 as shown in Fig. 6 for holding the two hooks against coming apart. This type of hinge has all of its parts integral with the strap sections and permits of the "opening" of the clip and the direct application thereof to the conduit with the same advantages as provided for in the first described form of my invention.

In Fig. 7 another form of my invention is shown as comprising metallic strap sections 22 and 23, and cushion strips 24 corresponding to those shown in Figs. 1 to 4 inclusive, but having a different arrangement of the bonding strips 25 and a somewhat different hinge connection between the strap sections.

In this modification the inner end portions of the strap sections are offset outwardly as at 26 and then bent inwardly back as at 27 to lie on the offset portions to form interfitting hinge barrels 28 and 29 which are joined by a hinge pin 30. This construction affords a smooth and even hinge joint on the inner sides of the strap sections and facilitates the bonding of the bonding strips to the strap at and by means of the hinge structure. As here shown each bonding strip has a terminal 31 clamped and held between the associated strap section and the bent back portion 27. These bent back portions may be riveted or welded as at 32 to the portions of strap sections they overlie. It should be noted that the bonding strips extend lengthwise of the cushion sections for contact with the conduit and that they may be extended through openings 33 in the cushions to reach to the hinge structure as here provided. In this manner the hinge serves the purposes of the hinge connections shown in the other forms hereof and in addition provides for an effective bonding of the bonding strips to the sectional metal strap.

Another modified form of this invention as shown in Figs. 8 and 9 is the same as the other forms hereof as to the metal strap sections 34 and 35, cushion strips 36 and bonding strips 37, except that the strap sections are separable and independently applicable to a conduit and subject to be hooked together. The section 34 of the strap has an angularly outwardly bent slotted end 38 adapted to receive in the slot therein a hook-shaped tongue 39 formed as an extension of the inner end of the strap section 35. This type of connector permits of a ready application of first one section to the conduit and the hooking of the other section to the first section and the swinging of the second on such connection into position to have the other terminals (not shown) but which are the same as shown in Fig. 1, secured together and to the metal structure of the airplane. This form affords all of the advantages of the first described form of my invention.

In all the embodiments of the invention the cushions of insulating material are separate, elongated strips each of which assumes a semi-circular shape when the clip is in its applied position, and an end of each of these strips is located adjacent to the hinge or means for flexibly uniting the two sections of the clip.

It will now be seen that my improved sectional clip when secured to a conduit in accordance with the provisions hereof will provide a conduit embracing and supporting clip having the requisite curvature to conform closely to the conduit and afford a smooth and continuous vibration reducing and protective cushioned seat which will eliminate abrasion and reduce wear of the conduit and also provide for electrically bonding the conduit to the metallic structure of an airplane.

It should be noted that my improved clip provides for the association with at least one of the cushion sections and at least one of the sections of the metallic strap, of a metallic bonding strip which has a portion disposed for contact with the conduit and another portion for contact with a section of the strap. Moreover, at least one of the several strap sections may be mounted on and contacted with the metallic structure of the aircraft as within the scope of my invention.

I claim:

1. In a conduit supporting clip, a sectional metallic strap for embracing and supporting a conduit, cushions of resilient insulation material mounted on sections of the strap to form a cushioned seat for the conduit, a metallic bonding strip on one of the cushions for contact with the conduit, terminals on the sections of the straps adapted to be secured to metallic structure to support the clip thereon, means for joining other terminals of said sections to form a conduit embracing unit, including bent back portions of said sections forming hinge barrels, and a hinge pin in said barrels, said bonding strip having a portion thereof clamped against and bonded to a section of the strap by means of one of said bent back terminals.

2. In a conduit supporting clip, a sectional metallic strap for embracing and supporting a conduit, cushions of resilient insulation material mounted on sections of the strap to form a cushioned seat for the conduit, a metallic bonding strip on one of the cushions for contact with the conduit, terminals on the sections of the straps adapted to be secured to metallic structure to support the clip thereon, means for joining other terminals of said sections to form a conduit embracing unit, including bent back portions of said sections forming hinge barrels, a hinge pin in said barrels, said bonding strip having a portion thereof clamped against and bonded to a section of the strap by means of one of said bent back terminals, and a rivet extending through said bonding strip portion and section of the strap.

HERMAN RAY ELLINWOOD.